United States Patent
Ho

[11] Patent Number: 6,098,850
[45] Date of Patent: *Aug. 8, 2000

[54] NON-SPILL BOTTLE FOR LIQUIDS AND THE LIKE

[76] Inventor: I-Chung Ho, 6958 Grovespring Dr., Rancho Palos Verdes, Calif. 90275

[*] Notice: This patent is subject to a terminal disclaimer.

[21] Appl. No.: 09/250,791

[22] Filed: Feb. 17, 1999

Related U.S. Application Data

[62] Division of application No. 08/873,070, Jun. 11, 1997, Pat. No. 5,934,017.

[51] Int. Cl.[7] .................................................. B67D 5/06
[52] U.S. Cl. ........................................ 222/185.1; 222/575
[58] Field of Search .................................. 222/575, 566, 222/568, 185.1; D7/312

[56] References Cited

U.S. PATENT DOCUMENTS

| | | | |
|---|---|---|---|
| 236,997 | 1/1881 | Dodge | 222/456 |
| D. 288,889 | 3/1987 | Mantani | D7/312 |
| 570,759 | 11/1896 | Law | 222/456 |
| 836,466 | 11/1906 | Sears | 222/456 |
| 3,902,652 | 9/1975 | Malcolm | 222/566 X |
| 4,437,587 | 3/1984 | Duering | 222/207 |
| 4,491,245 | 1/1985 | Jamison | 222/575 X |
| 5,217,696 | 6/1993 | Wolverton et al. | 422/121 |
| 5,269,094 | 12/1993 | Wolverton et al. | 47/79 |
| 5,351,438 | 10/1994 | Wolverton et al. | 47/79 |
| 5,433,923 | 7/1995 | Wolverton et al. | 422/121 |

*Primary Examiner*—Andres Kashnikow
*Assistant Examiner*—Sean P. O'Hanlon

[57] ABSTRACT

A non-spill liquid bottle having an extended curved neck in the form of a number seven "7", a letter "Z" or a letter "S" incorporated into the design of its mouth opening. This non-spill design allows a full bottle of liquid to be partially turned over with liquid level inside the bottle being higher than the liquid level at the mouth opening and no liquid will flow out from the bottle. Liquid will start to flow out only after the bottle is turned further and the tilting angle reach the predetermined pouring angle. The pouring angle is the tilting angle of the bottle when outside air starts to enter the bottle and liquid inside the bottle starts to flow out. This design makes pouring liquid from a full bottle much less likely to spill.

3 Claims, 6 Drawing Sheets

NON-SPILL BOTTLE FOR LIQUIDS AND THE LIKE

This is a divisional of application Ser. No. 08/873,070 filed Jun. 11, 1997, now U.S. Pat. No. 5,934,017.

BACKGROUND OF THE INVENTION

It is well known that plants need air, water, and light for growth. It is also known that plants purify air. The purification of air through plant leaves are well known. However, the role of complex biological and bacterial process of plant's root system in breaking down air polluting chemicals and suppressing the growth of microbes has only become understood in recent years.

Since the energy crisis in the 70's, new homes are being built with energy efficiency in mind. To achieve this, buildings tend to have less air circulation with the outside air and better seal around doors and windows. As a result of these changes in addition to wide spread use of plastics, paints and other synthetic materials and chemicals, the indoor air pollution have become a serious health problem, which resulted in the so called sick air syndrome. Several air purification planters and apparatus were proposed by U.S. patents such as U.S. Pat. Nos. 5,217,696; 5,269,094; 5,351,438; and 5,433,923. These patents suggest means to improve the interaction of air with the root system of the plants. Major deficit of these designs include 1) lack of sufficient water reservoir in the planter which increases the work of maintaining the plants, 2) relatively large variation of water level within the planter which is, in many respects, an undesirable consequence of being unable to control a constant water level in the planter.

On the market everywhere, there are many kinds of the so called "self watering" planters available to the public. There are very little difference among these planters. The basic feature of these "self watering" planters is a small water reservoir at the bottom of the planter with a water filling opening near the bottom of the planter side wall. A perforated divider separates soil from the water reservoir except that there are few studs or channels in the divider which extend down into the water reservoir and all the way to the bottom of the planter so that soil in these studs or channels were able to be submerged in the water at any given water level in the water reservoir. Capillary action of the soil is able to lift water to the root system and support plant growth. The disadvantages of these "self watering" planters include 1) the size of the water reservoir is usually small and the uncontrollable water level also changes with time, 2) the bottom exposed portion of the soil and the water reservoir are directly open to the ambient air through the water refill opening and thus mildew or microbe growth is a common problem.

This invention relates to a planter with a removable water reservoir/liquid bottle which is capable of maintaining a constant water level in the planter. Because the water reservoir/liquid bottle is exterior to the planter and removable for refill, the size of the water reservoir/liquid bottle may be made as big as one wishes. The neck of the water reservoir/liquid bottle mouth "plugs" into the opening of the planter thus minimized the direct contact of water and potting medium in the container with the ambient air and thus reduced or eliminated the problem of mildew around water in the planter.

With different inserts, the interface areas of ambient air with the potting medium and the root system is maximized, thus enhancing the effectiveness of air purification process by the root system. A lamp and a circulation fan are also provided. The location of the fan is imbedded within the potting medium and the water in the planter thus greatly reducing the vibration and noise level of the fan.

When inserting a full bottle of water to a drinking fountain stand, pouring a can of motor oil to the engine, pouring anti-freeze liquid to the radiator and in many other occasions, the liquid in the bottle is often too full and the receptacle spot has too small of an opening. Under these circumstances, one must act quickly or very often spill the liquid all over the place. The extended curved neck of the liquid bottle of this invention allows the bottle to be laid flat without spilling. The extended curved neck design even allows the user to raise the bottom of the bottle such that the liquid level inside the liquid bottle is higher than its mouth opening without spilling. This special feature makes the insertion and removal of water bottle from a drinking fountain extremely easy. In fact, this design simply makes the pouring of liquid from a container much more manageable with less chance of spilling.

SUMMARY OF THE INVENTION

It is an object of the present invention to provide an improved planter for plants.

It is another object of the present invention to provide a removable and refillable water reservoir/liquid bottle for the planter. The removable water reservoir/liquid bottle is made of transparent material or with a strip of see through window so that the water level in the water reservoir/liquid bottle is in clear view.

It is another object of the present invention to provide and maintain a constant water level in the planter.

It is another object of the present invention to increase the interface surface areas between ambient air with the potting medium and the root system. The improved air circulation and the inclusion of a lamp are all means of improving the effectiveness of air purification and sterilization.

It is yet another object of the present invention to provide an improved water reservoir/liquid bottle such that it is easier to turn over for insert to the planter, water fountain or other applications or just for pouring of liquid without the concern of spilling.

The present invention includes an improved planter with a small opening at near the bottom of the planter. A water reservoir/liquid bottle with an extended curved neck can be "plugged" into the opening of the planter and minimized the direct contact of water and potting medium in the planter with the ambient air. A constant level of water is maintained inside the planter. This constant water level is achieved by the upside down water reservoir/liquid bottle and the partial vacuum created within the water reservoir/liquid bottle.

Three different version of inserts can be placed inside the planter. Each one serves different purposes and with different complexity. The simplest insert will help to increase the interface areas of ambient air with the potting medium and the root system thus improves the breathing or circulation of air in the root system and enhance the air purification process by the root system. The second insert includes a circulation fan such that the circulation of air is greatly increased. The third insert includes a lamp with or without a circulation fan. The lamp using either incandescent bulb or bulb with ultra violet feature will help to disinfect the air being circulated around the bulb. The inclusion of a fan will further enhance the air circulation.

For air purification purpose, hydroponically soil-less planting is the desirable approach. Water absorbing pebbles such as expended clay and zeolite with or without activated carbon are ideal potting medium. This type of potting medium often leave many void air spaces in the potting medium and the root system and allows circulating air to be scrubbed by the wet pebble surfaces and the root system and maximizing the effect of air purification.

Conventional potting soil may also be used in this planter. The air purification property does reduce considerably, nevertheless, it is still better than the regular planter. Other advantages of the planter described earlier still apply.

The extended curved neck design of the water reservoir/liquid bottle provides a unique feature which allows the water reservoir/liquid bottle to be laid flat after filling without spilling any liquid. In fact, the bottom of the water reservoir/liquid bottle can be lifted even higher with the liquid line inside being higher than the opening of the water reservoir/liquid bottle without spilling any liquid. Bottle design with this feature could be applied to, in addition to the disclosed planter as described in this application, bottled water for drinking fountain, motor oil bottle, anti-freeze fluid bottle, cooking oil bottle and many other applications whenever spillage is a concern when the bottle is turned for pouring.

DETAILED DESCRIPTION OF THE INVENTION

Figure 1:
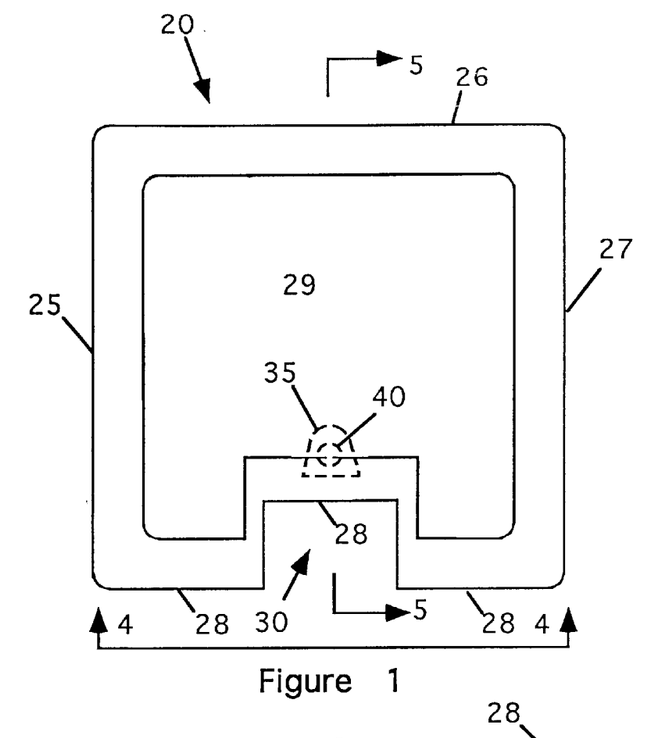
FIG. 1 is a top view of the planter of the present invention.
Figure 2:
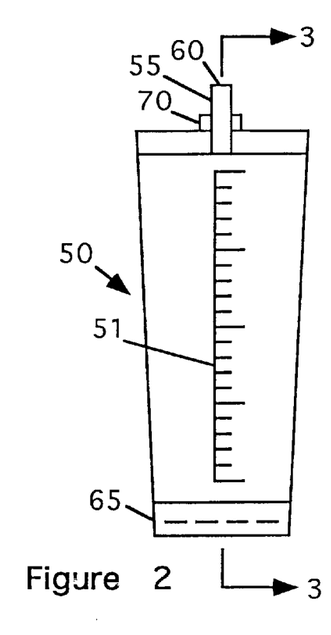
FIG. 2 is a top view of the removable water reservoir/liquid bottle of the present invention being laid flat.
Figure 3:
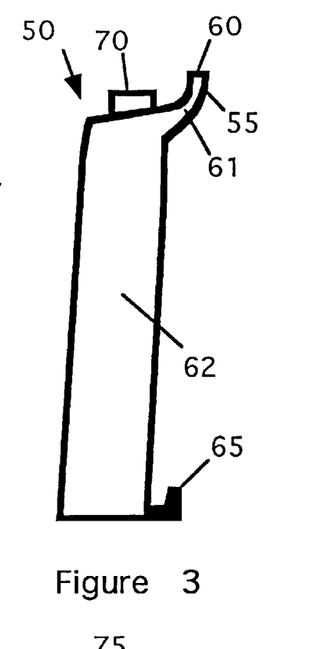
FIG. 3 is the cross-sectional view of FIG. 2 along line 3—3.
Figure 4:
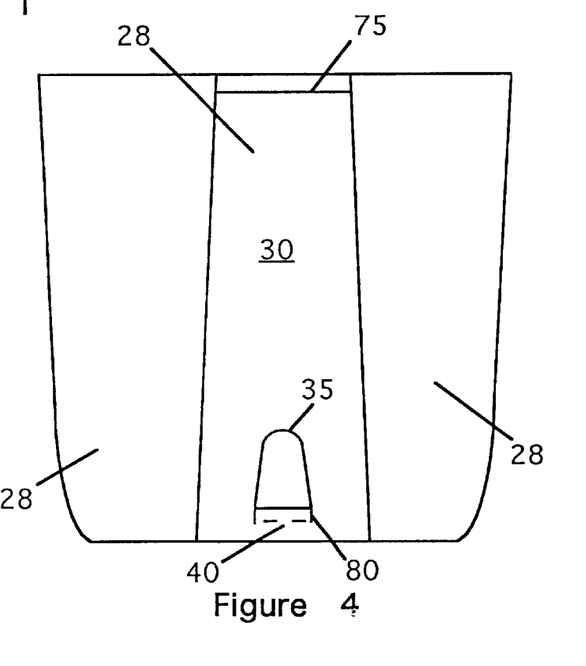
FIG. 4 is the side view of FIG. 1 in the direction along line 4—4.
Figures 5, 6, 7, 8:
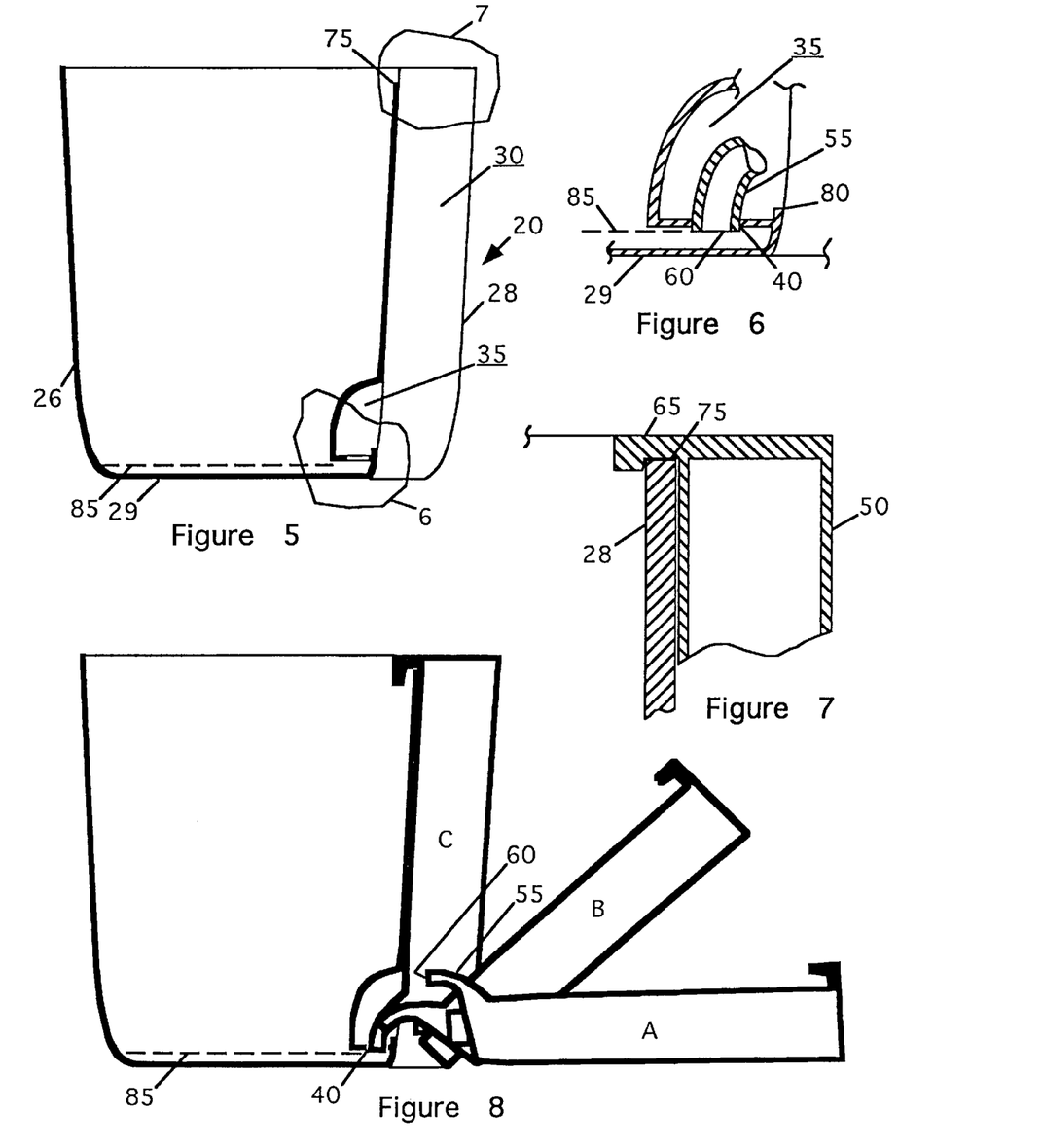
FIG. 5 is the cross-sectional view of FIG. 1 along line 5—5.
FIG. 6 is the detailed view of the portion indicated in zone 6 of FIG. 5.
FIG. 7 is the detailed view of the portion indicated in zone 7 of FIG. 5 with the water reservoir/liquid bottle (partially shown) hung on the side wall of the planter.
FIG. 8 shows the same cross-sectional view of FIG. 5 with water reservoir/liquid bottle inserting to the opening of the planter in three progressive positions.

FIG. 1 shows the top view of the planter 20 of the present invention. Which has four side walls 25, 26, 27, and 28 and a bottom 29. The rectangular shaped planter shown is for example only, many other shapes may also be suitable. One of the side wall 28 has an indentation 30. Near the bottom of the planter at the indentation 30, the side wall 28 has a further cavity 35 (may be seen better in FIGS. 4 and 5 and is partially detailed in FIG. 6). There is an opening 40 at the bottom of the cavity 35. A water reservoir/liquid bottle 50 shown in FIGS. 2 and 3 is shaped to match the indentation 30. FIG. 2 shows the top view of the water reservoir/liquid bottle 50 which is being laid flat. The water reservoir/liquid bottle 50 is made of transparent material or at least a portion of the side wall (the bottom wall as shown in FIG. 2) is transparent and is marked with a scale 51. The amount of water remaining in the water reservoir/liquid bottle 50 will be clearly visible while inserted to the planter. FIG. 3 is the cross-sectional view of the water reservoir/liquid bottle 50 along line 3—3 in FIG. 2. The heavy bold lines shown in FIG. 3 as well as other figures described later represent the thickness of the cross-sectional walls. The water reservoir/liquid bottle 50 has an extended curved neck 55 and a mouth opening 60. A passage way 61 connects the mouth opening to the storage chamber 62 where water is stored. It also has a hanging hook 65, and a refill opening with a cap 70. FIG. 4 is the side view of the planter 20 along line 4—4 in FIG. 1. The indented portion of the side wall 28 has lower side wall at edge 75 where the hanging hook 65 of the water reservoir/liquid bottle 50 will hang. The cavity 35 allows the opening 40 to be further set back into the planter (better seen in FIGS. 5 and 6). This arrangement plus all the side walls of the planter being tilted inward with the bottom of the planter being smaller than the top so that the stacking of planters to save space for shipping and storage becomes possible. A raised edge 80 surround the opening 40 will catch any water spill during the insertion or removal of the water reservoir/liquid bottle 50. FIG. 5 shows the cross-sectional view of the planter along line 5—5 in FIG. 1. A detailed cross-sectional view for the portion of region 6 is shown in FIG. 6. FIG. 6 includes a section of the extended curved neck 55 of the water reservoir/liquid bottle 50. FIG. 7 is a detailed partial cross-sectional view of the region 7 shown in FIG. 5 with the water reservoir/liquid bottle 50 (only a small portion is shown) already hung on side wall 28 at the lowered edge 75. FIG. 8 is the same cross-sectional view of FIG. 5 showing how the water reservoir/liquid bottle 50 is inserted into the planter 20 with the water reservoir/liquid bottle shown in three progressive positions. When the water reservoir/liquid bottle 50 is filled and the refill cap 70 closed tight, the water reservoir/liquid bottle may be laid flat in position A. The specially designed extended curved neck 55 allows the water reservoir/liquid bottle to be laid flat without spilling any water. In fact, the water reservoir/liquid bottle could be lifted to an angle well beyond position B as shown in FIG. 8 before water will start to flow out. The extended curved neck 55 also allows the mouth opening 60 to be aimed toward the cavity 35 at the opening 40 easily. The insertion of water reservoir/liquid bottle 50 into the planter 20 from position A through position B to the final hung position C becomes easy and less likely that any water will spill outside the planter. Due to a partial vacuum created within the water reservoir/liquid bottle 50, the water level line 85 in the planter will be automatically maintained at the mouth opening 60 of the water reservoir/liquid bottle 50 for as long as there is water remaining in the water reservoir/liquid bottle. The indentation 30 shown in the figures and described in this disclosure is not a necessary feature. The inclusion of this indentation is for better visual appearance of the planter. After the water reservoir/liquid bottle is filled with water and hung to the planter, the water reservoir/liquid bottle fits well with the indentation and the planter appears square again on the outside. If the planter is rectangular in shape, the water reservoir/liquid bottle may very well have the same width of the planter without indentation and still have a pleasant appearance.

Figure 9:
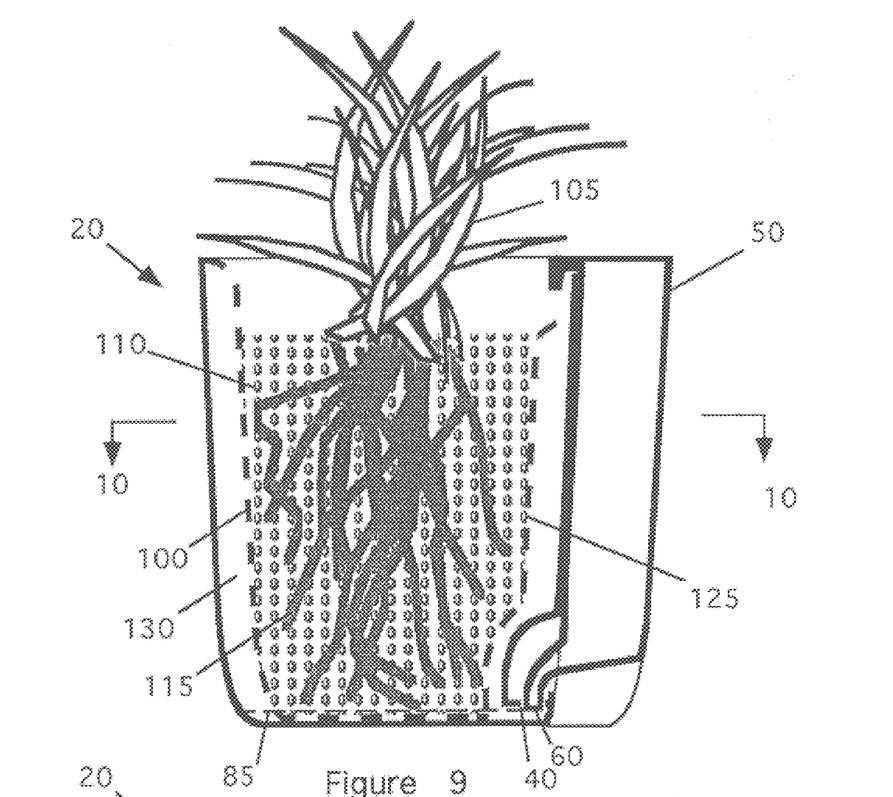
FIG. 9 shows the same cross-sectional view of FIG. 5 with the first insert and water reservoir/liquid bottle hung in place and plant potted with potting medium.
Figure 10:
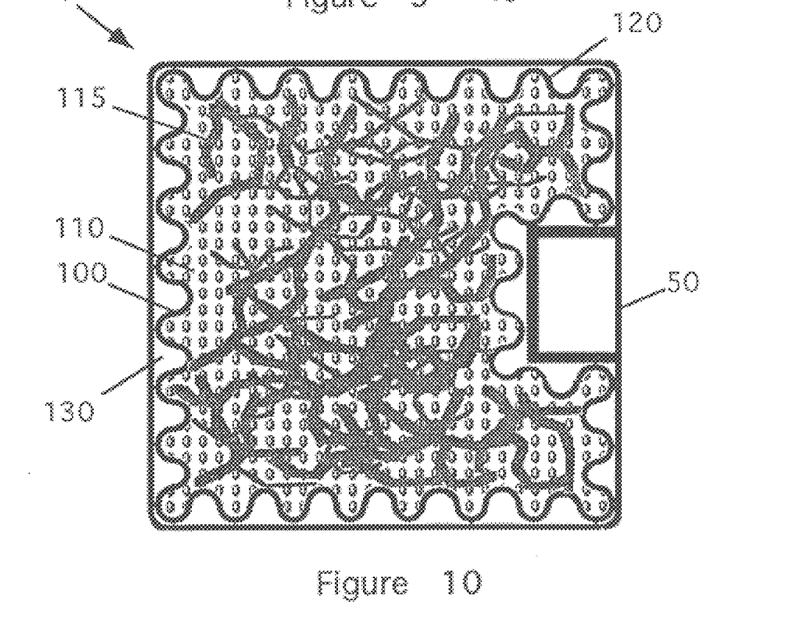
FIG. 10 shows the cross-sectional view of FIG. 9 along line 10—10.

FIG. 9 shows the same cross-sectional view of FIG. 5 along line 5—5 in FIG. 1 with water reservoir/liquid bottle 50 inserted. FIG. 9 also shows the first insert 100 along with plant 105 potted using potting medium 110. FIG. 10 shows the cross-sectional view along line 10—10 in FIG. 9. The purpose of this insert 100 is to provide a maximized interface areas of ambient air with the potting medium 110 and the root system 115 of the plant 105. It is achieved by utilizing any suitable form of wavy side walls 120 of the insert 100 against the inside surfaces of the planter side walls such that narrow air passage ways 130 are formed. The wavy side walls have small holes or perforations 125 (shown in FIG. 9). These holes allow the breathing of the root system with ambient air in the air passage ways 130. Potting medium 110 fill the insert where the plant 105 is potted. The bottom layers of the potting medium are submerged under the water level line 85. Capillary action along with the suction of the root system 115 carry water to the upper portion of the potting medium and therefore support the plant growth. The tip of the extended curved neck 55 of the water reservoir/liquid bottle 50 closes off the opening 40 in the planter and isolates ambient air from direct contact with the water in the planter. Any contact of air must pass through the potting medium and the root system or through the narrow air passage ways 130. The ability of the root system in suppressing microbe growth in the vicinity of the root system including the air passage ways 130 will help reduce or eliminate mildew growth near the water line 85, which has always been a major problem in the ordinary "self watering" planter. The biological and bacterial processes of the root system along with the increased interface areas with ambient air will greatly enhance the air purification process compared to the same plant growing in an ordinary planter.

Figure 11:
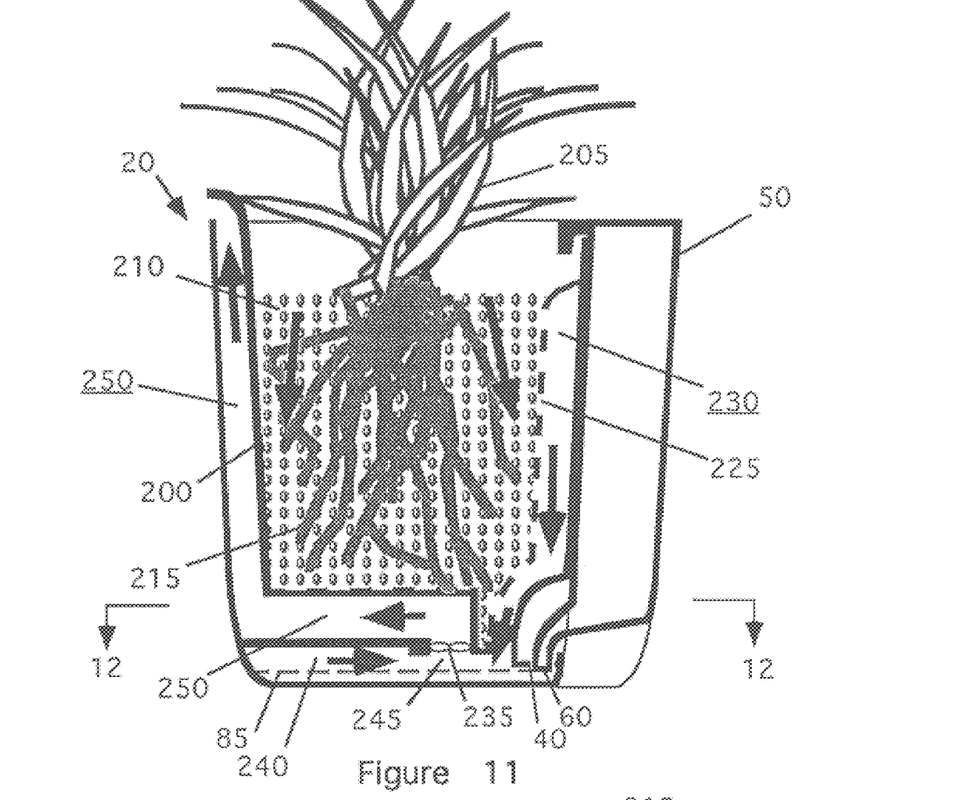
FIG. 11 shows the same cross-sectional view of FIG. 5 with the second insert (including fan) and water reservoir/liquid bottle hung in place and plant potted with potting medium.
Figure 12:
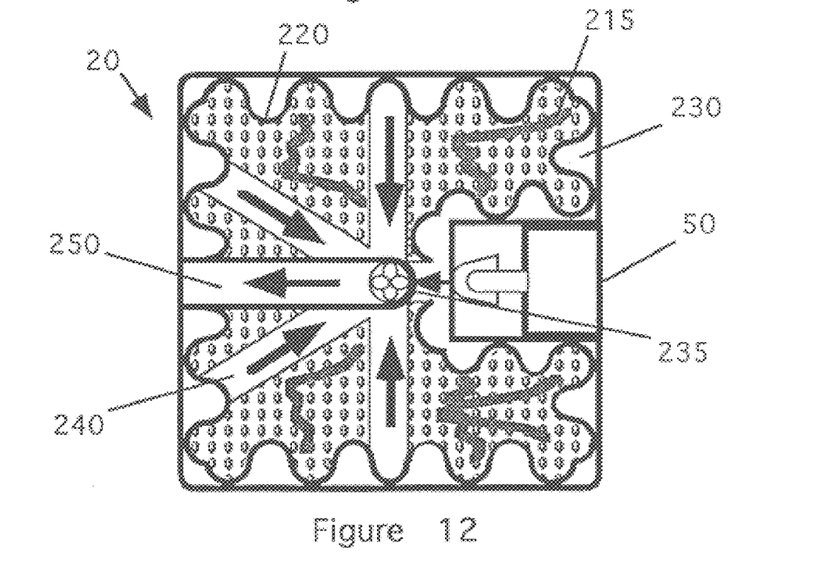
FIG. 12 shows the cross-sectional view of FIG. 11 along line 12—12.

FIG. 11 shows the same cross-sectional view of FIG. 5 along line 5—5 in FIG. 1 with water reservoir/liquid bottle 50 inserted. FIG. 11 also shows the second insert 200 along with plant 205 potted using potting medium 210. FIG. 12 shows the cross-sectional view along line 12—12 in FIG. 11. The purpose of this insert 200 is the inclusion of a circulation fan 235 to enhance the air flow in addition to maximize the interface areas of ambient air with the potting medium 210 and the root system 215 of the plant 205. The wavy side walls 220 of the insert 200 against the inside surfaces of the planter side walls formed narrow air passages ways 230. The wavy side walls 220 have small holes or perforations 225 for air to pass through. A circulation fan 235 is located at the bottom center of the insert 200 slightly above the water level line 85. The use of circulation fan helps to increase air flow through the potting medium and the root system. The circulating air is then passed through the small holes or perforations 225 of the insert and down through the air passage ways 230 to the bottom of the planter. Partition walls at the bottom of the insert form air inlet ducting 240, which guide the circulation air toward the suction side 245 of the fan 235. Discharge duct 250 guides the exhaust air to the ambient. Potting medium 210 fills the insert where the plant 205 is potted. The bottom layers of the potting medium are submerged under the water level line 85. Capillary action along with the suction of the root system 215 carries water to the upper portion of the potting medium and therefore support the plant growth.

Figure 13:
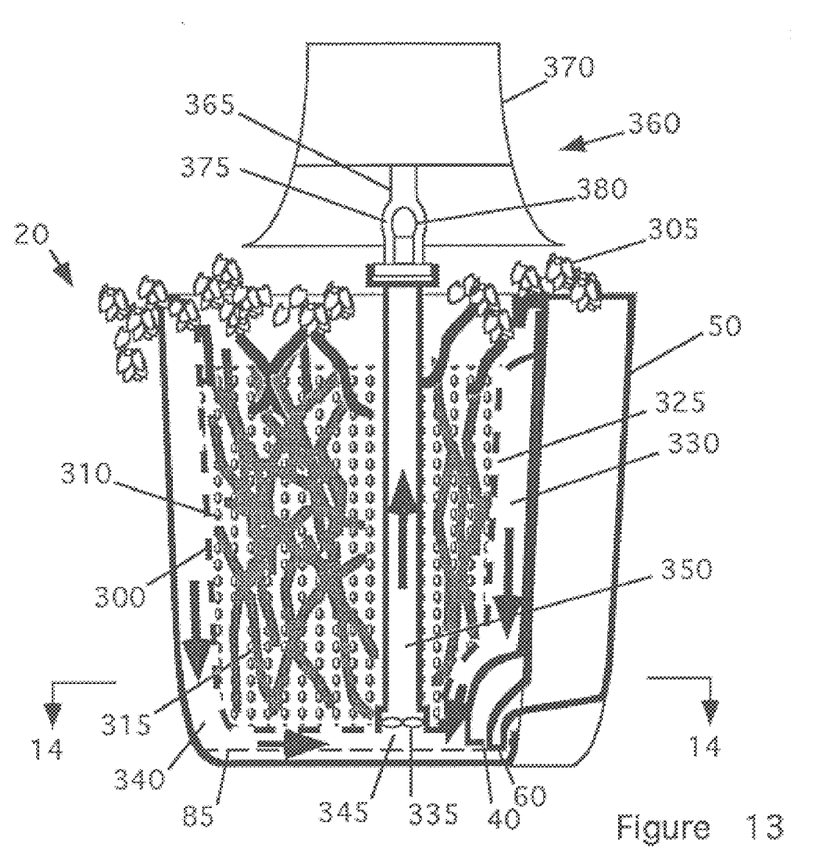
FIG. 13 shows the same cross-sectional view of FIG. 5 with the third insert (including lamp and fan) and water reservoir/liquid bottle hung in place and plant potted with potting medium.
Figure 14:
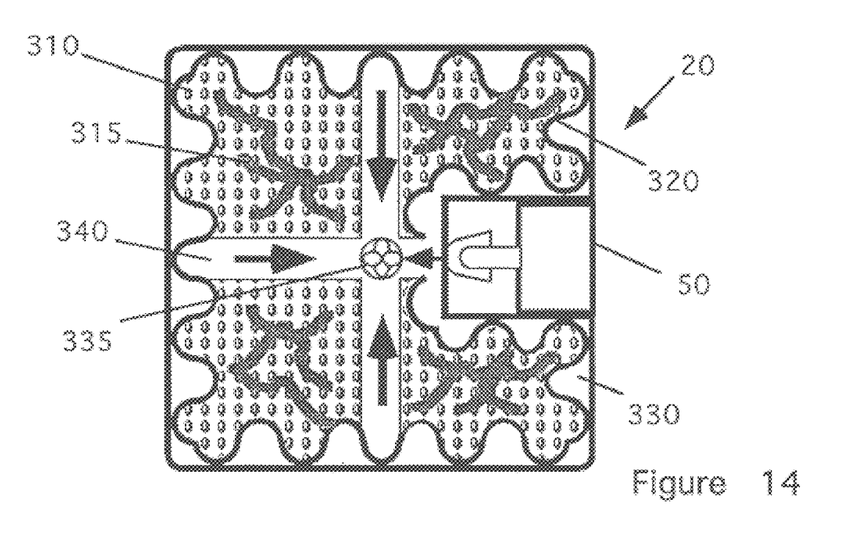
FIG. 14 shows the cross-sectional view of FIG. 13 along line 14—14.

FIG. 13 shows the same cross-sectional view of FIG. 5 along line 5—5 in FIG. 1 with water reservoir/liquid bottle 50 inserted. FIG. 13 also shows the third insert 300 along with plants 305 potted using potting medium 310. FIG. 14 shows the cross-sectional view along line 14—14 in FIG. 13. The purpose of this insert 300 is to include a lamp 360 attached to the discharge duct 350 along with a glass shield 365 and a lamp shade 370 in addition to maximize the interface areas of ambient air with the potting medium 310 and the root system 315 of the plants 305. The wavy side walls 320 of the insert 300 against the inside surfaces of the planter side walls form narrow air passage ways 330. The heat of the lamp will heat the air and cause the air to rise and pass through the air gap 375 between light bulb 380 and the glass shield 365. This rise of air creates a suction at the discharge duct 350 which in turn pulls ambient air to pass through potting medium 310 and the root system 315 then through holes or perforations 325 and down the air passage ways 330, the air inlet ducting 340 to the discharge duct 350. Circulation fan 335 is located at the bottom of the discharge duct 350 and above the water level line 85. Some enhancement of air circulation by fan is helpful but too much air flow may cause the light bulb 380 being unable to heat the air hot enough for sterilization. Potting medium 310 fills the insert where the plant is potted. The bottom layers of the potting medium submerged under the water level line 85. Capillary action along with the suction of the root system 315 carries water to the upper portion of the potting medium and therefore supports the plant growth.

Figure 15:
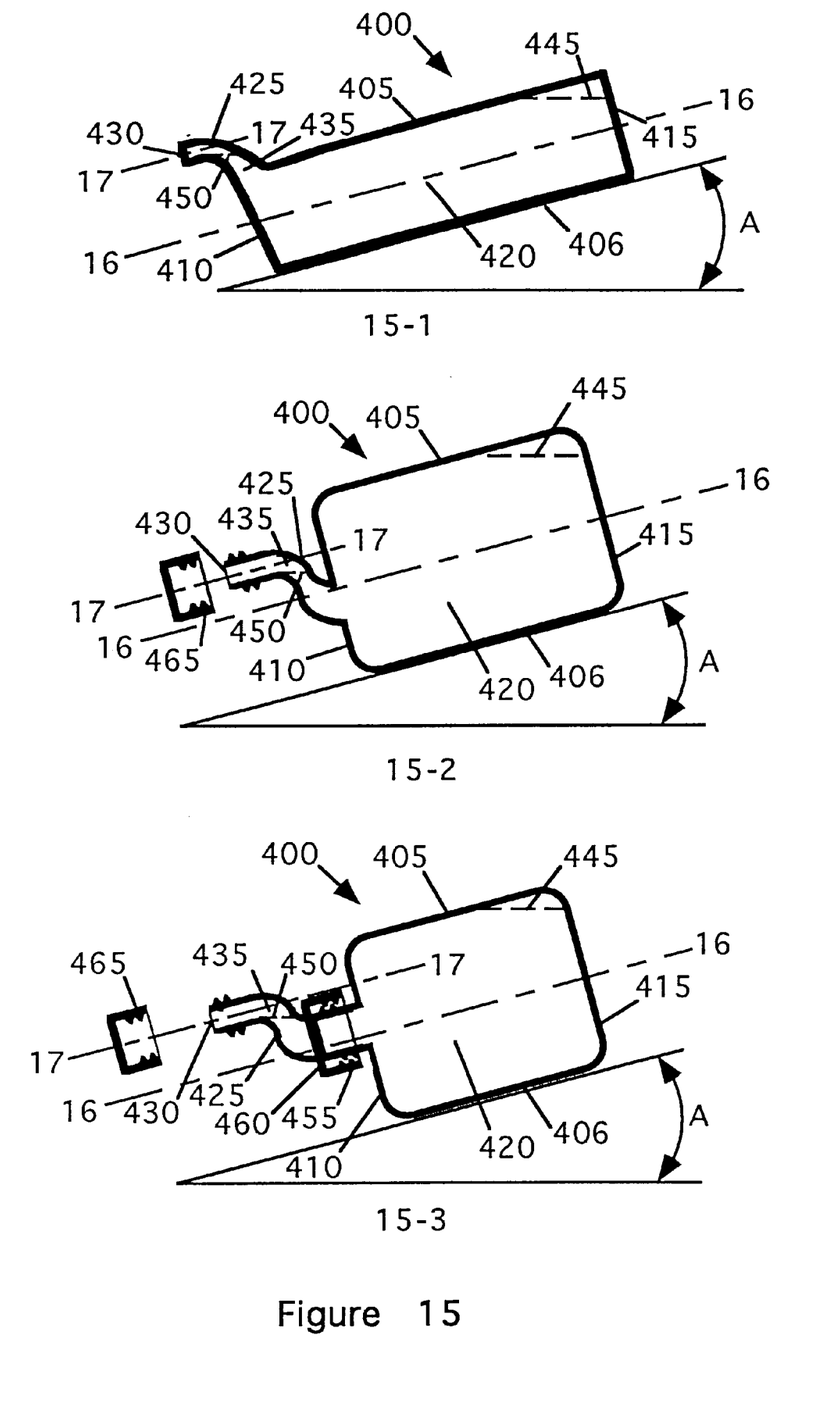
FIG. 15 shows examples of liquid bottle designs with the extended curved neck feature presented in this disclosure which may be used as a refillable water bottle or for many other applications.

FIG. 15 shows examples of various versions of liquid bottle 400 with the extended curved neck feature incorporated into the design. The liquid bottle 400 may be of any shape or size. It generally has side walls 405, top wall 410, and bottom wall 415. If desirable, one side wall 406 may be flat to allow the liquid bottle to lay flat after filling. A major axis 16—16 generally defines the center line of the liquid bottle. The liquid bottle is in its upright position when the major axis is vertical and the top wall 410 is facing up. The extended curved neck 425 could be in the form of a letter "7" (as shown in FIG. 15-1), or in the form of a letter "Z", or "S" (as shown in FIGS. 15-2, 15-3). A mouth opening 430 is located at the end of the extended curved neck. A minor axis 17—17 perpendicular to the plane of the mouth opening. In general, the minor axis 17—17 is parallel with the major axis 16—16. However, it is not necessary to do so, and the two axes may be oriented at a small angle. The extended curved neck 425 may start from almost anywhere on the liquid bottle 400 but usually starts from the top wall 410 or from the side wall near the top wall and on the opposite side of the flat side wall 406. A passage way 435 along the center line of the extended curved neck connects the mouth opening 430 with the inner chamber 420 of the liquid bottle 400.

After the liquid bottle is filled with liquid in the upright position, it can be laid flat on the side wall 406 and the liquid inside the chamber 420 will not flow out even if the liquid level line 445 inside the chamber 420 is higher than the liquid level line 450 at the mouth opening as long as it is oriented correctly with the "7", "Z" or "S" shaped curved neck in the upright position where the mouth opening end of the curved neck is on the upper most location when the liquid bottle is laid down flat before tilting as shown in FIG. 15 with angle A at zero degree. therefore. The bottom wall 415 is lifted further to pour the liquid. The liquid will not start to flow until the angle "A" reaches a pouring angle which can be anywhere between zero (0) to nearly ninety (90) degrees. This angle "A" is determined by the shape, size, curvature, and restrictions of the passage way 435.

When this angle "A" reaches the pouring angle, outside air will start to enter the liquid bottle at the liquid level line 450 in the extended curved neck 425 and at the same time liquid inside the liquid bottle will start to flow out The extended curved neck feature may be built-in with the liquid bottle (as shown in FIGS. 15-1, and 15-2) or built into a cap 455 by then attaching the cap to any existing bottle with a gasket 460 for leak proofing (as shown in FIG. 15-3). Optional closing cap or plug 465 may be used to enclose the liquid bottle mouth opening when the bottle is not in use or during transportation.

Various modifications to the depicted and described apparatus will be apparent to those skilled in the art. Accordingly, the forgoing detailed description of the preferred embodiment should be considered exemplary in nature and not as limiting to the scope and spirit of the invention as set forth in the appended claims.

What is claimed is:

1. A liquid bottle comprising:

a container for the storage of liquid with a major axis along the center line of the container; and a curved neck at the top end region of the container; and a curved passageway along the center line of the said curved neck with a mouth opening communicating the said container with the ambient; and the said curved passageway has the basic form of a number "7", a letter "Z", or a letter "S"; and the said mouth opening is located at a terminating end of an upper portion of the curved neck having the form of the number "7" or letters "Z" or "S"; and after filling the container with liquid, the said container may be laid down with the bottom end of the container being higher than the top end of the container and the liquid level line inside the container being higher than the liquid level line at the mouth opening of the curved neck without spilling liquid as long as the "7" or "Z" or "S" shaped curved neck is positioned such that the number "7" or letters "Z" or "S" is oriented in the upright direction when the container is laid down (the major axis is in the substantially horizontal direction) and the mouth opening of the curved neck is on the upper most position; and the size, shape, and the curvature of the curved passageway determine a starting angle where the liquid inside the container will begin to flow out from the container; and the starting angle is a tilting angle of the container when the outside air starts to enter the container and liquid starts to flow out from the container.

2. A liquid bottle comprising:

a container for the storage of liquid with a major axis along the center line of the container; and an extended curved neck at the top end region of the container; and a curved passageway along the center line of the said extended curved neck with a mouth opening communicating the said container with the ambient; and the said curved passageway has the basic form of a number "7" a letter "Z", or a letter "S"; and the said mouth opening is located at a terminating end of an upper portion of the extended curved neck having the form of the number "7" or letters "Z" or "S"; and after filling the container with liquid, the said container may be laid down with the bottom end of the container at higher than the top end of the container as long as the "7" or "Z" or "S" shaped extended curved neck is positioned such that the number "7" or letters "Z" or "S" is oriented in the upright direction when the container is laid down (the major axis is in the substantially horizontal direction) and the mouth opening of the extended curved neck is on the upper most position; and vacuum created inside the container allows the tilting of the container further such that the liquid level line inside the container is higher than the liquid level line at the mouth opening of the curved neck and prevents the flowing of liquid from the container until a tilting angle is greater than a predetermined starting angle; and the said container is substantially rigid such that the container walls are capable of withstanding the vacuum created inside the bottle without being deflexed appreciably; and the size, shape, and the curvature of the said extended curved passageway determine the starting angle which is the tilting angle of the container when outside air starts to enter the container and liquid inside the container will begin to flow out from the container.

3. A liquid bottle comprising:

an existing container with an opening at the top for the storage of liquid; and a mating piece having a mating end threaded to or plugged into the opening of the said existing container using a gasket or sealant for preventing leakage when needed; and a curved neck at a far end region of the mating end of the said mating piece; and a curved passageway along the center line of the said curved neck with a mouth opening communicating the said container with the ambient; and the said curved passageway has the basic form of a number "7", a letter "Z", or a letter "S"; and the said mouth opening is located at a terminating end of an upper portion of the curved neck having the form of the number "7" or letters "Z" or "S"; and after filling the container with liquid, the said container may be laid down with the bottom end of the container being higher than the top end of the container and the liquid level line inside the container being higher than the liquid level line at the mouth opening of the curved neck without spilling liquid as long as the "7" or "Z" or "S" shaped curved neck is positioned such that the number "7" or letters "Z" or "S" is oriented in the upright direction when the container is laid down (the major axis is in the substantially horizontal direction) and the mouth opening of the curved neck is on the upper most position; and the size, shape, and the curvature of the curved passageway determine the starting angle where the liquid inside the container will begin to flow out from the container; and the said starting angle is a tilting angle of the container when outside air starts to enter the container and liquid starts to flow out from the container.

* * * * *